United States Patent
Kodama et al.

(10) Patent No.: US 10,160,895 B2
(45) Date of Patent: Dec. 25, 2018

(54) COOLANT COMPOSITION, METHOD OF OPERATING INTERNAL COMBUSTION ENGINE USING THE SAME, AND USE OF THE SAME

(71) Applicants: TOYOTA JIDOSHA KABUSHIKI KAISHA, Toyota-shi, Aichi-ken (JP); KAO CORPORATION, Chuo-ku, Tokyo (JP); JAPAN CHEMICAL INDUSTRIES CO., LTD., Shizuoka-shi, Shizuoka-ken (JP)

(72) Inventors: Yasuaki Kodama, Toyota (JP); Kazuhiro Miyajima, Okazaki (JP); Ryota Makino, Toyota (JP); Shogo Kamenoue, Wakayama (JP); Shinichi Ogura, Shizuoka (JP); Kazuhito Yaeda, Shizuoka (JP); Yoichiro Yoshii, Shizuoka (JP); Tomoyuki Nakano, Fuji (JP); Masayuki Nagasawa, Shizuoka (JP)

(73) Assignees: TOYOTA JIDOSHA KABUSHIKI KAISHA, Toyota-shi, Aichi-ken (JP); KAO CORPORATION, Chuo-ku, Tokyo (JP); JAPAN CHEMICAL INDUSTRIES CO., LTD., Shizuoka-shi (JP)

( * ) Notice: Subject to any disclaimer, the term of this patent is extended or adjusted under 35 U.S.C. 154(b) by 0 days.

(21) Appl. No.: 15/538,983
(22) PCT Filed: Dec. 23, 2015
(86) PCT No.: PCT/IB2015/002507
§ 371 (c)(1),
(2) Date: Jun. 22, 2017
(87) PCT Pub. No.: WO2016/103027
PCT Pub. Date: Jun. 30, 2016

(65) Prior Publication Data
US 2017/0369756 A1    Dec. 28, 2017

(30) Foreign Application Priority Data

Dec. 26, 2014  (JP) .................. 2014-265468

(51) Int. Cl.
  *C09K 5/10*   (2006.01)
  *C09K 5/20*   (2006.01)
  *C23F 11/10*  (2006.01)

(52) U.S. Cl.
  CPC ........... *C09K 5/10* (2013.01); *C09K 5/20* (2013.01); *C23F 11/10* (2013.01)

(58) Field of Classification Search
  CPC .................. C09K 5/10; C09K 5/20
  (Continued)

(56) References Cited

U.S. PATENT DOCUMENTS 3,775,349 A * 11/1973 Turvell ............ C11D 1/29
                                                510/237
4,592,875 A *  6/1986 Kesling, Jr. ...... C07C 305/00
                                                510/537

(Continued)

FOREIGN PATENT DOCUMENTS

JP    02-166191 A    6/1990
JP    08-183950 A    7/1996
(Continued)

*Primary Examiner* — Jane L Stanley
(74) *Attorney, Agent, or Firm* — Sughrue Mion, PLLC

(57) ABSTRACT

A coolant composition includes: a viscosity improving agent; at least one alkali metal compound selected from the group consisting of alkali metal salts and alkali metal hydroxides; and a base composed of water and/or at least one alcohol selected from the group consisting of a monohydric alcohol, a dihydric alcohol, a trihydric alcohol, and a glycol monoalkyl ether, wherein the viscosity improving agent is a compound represented by a formula of $R^1O$—$(R^2O)_m$—$SO_3M$, where $R^1$ represents a linear or branched alkyl or alkenyl group having 16 to 24 carbon atoms, $R^2$ represents an ethylene group or a propylene group, m (Continued)

represents an average addition molar number of $R^2O$ and a number from 0.5 to 10, and M represents a cation or a hydrogen atom, and a kinetic viscosity of the coolant composition is 8.5 $mm^2$/sec or higher at 25° C. and is 2.0 $mm^2$/sec or lower at 100° C.

10 Claims, 3 Drawing Sheets

(58) Field of Classification Search
USPC .................................................. 252/73
See application file for complete search history.

(56) References Cited

U.S. PATENT DOCUMENTS

| | | | | |
|---|---|---|---|---|
| 4,704,220 A | * | 11/1987 | Goddard | C09K 5/20 252/73 |
| 4,717,495 A | * | 1/1988 | Hercamp | C02F 5/105 252/387 |
| 6,953,534 B1 | * | 10/2005 | Hudgens | C09K 5/20 252/380 |
| 2004/0211937 A1 | | 10/2004 | Jeschke et al. | |
| 2015/0211407 A1 | | 7/2015 | Hirai et al. | |

FOREIGN PATENT DOCUMENTS

| | | |
|---|---|---|
| JP | 09-227859 A | 9/1997 |
| JP | 2010-236064 A | 10/2010 |
| JP | 2010-270256 A | 12/2010 |
| JP | 2011-121991 A | 6/2011 |
| JP | 2011-132285 A | 7/2011 |
| JP | 2011-137089 A | 7/2011 |
| JP | 2014-012831 A | 1/2014 |
| JP | 2014152304 A | 8/2014 |
| WO | 2013183161 A1 | 12/2013 |

* cited by examiner

FIG. 2

| | | | Examples | | | | | | | | |
|---|---|---|---|---|---|---|---|---|---|---|---|
| | | | 1 | 2 | 3 | 4 | 5 | 6 | 7 | 8 | 9 |
| Mixing Amount (part(s) by mass) | Base | Ethylene Glycol | 49.8 | 49.8 | 49.8 | 49.8 | 50 | 50 | 79.7 | 49.8 | 79.7 |
| | | Ion Exchange Water | 50 | 50 | 50 | 50 | 50 | 50 | 20 | 50 | 20 |
| | Rust Inhibitor[1] | | 0.2 | 0.2 | 0.2 | 0.2 | | | 0.3 | 0.2 | 0.3 |
| | Viscosity Improving Agent A[2] | | 0.25 | 0.13 | | | 0.13 | | | | |
| | Viscosity Improving Agent B[3] | | | | 0.40 | 0.15 | | 0.40 | 0.006 | 1.81 | 0.10 |
| | Alkali Metal Compound[4] | | 3.06 | 3.06 | 3.06 | 3.06 | 0.28 | 0.28 | 3.06 | 0.28 | 25.1 |
| | Thickener[5] | | | | | | | | | | |
| Content of Base with respect to 100 parts by mass of Coolant Composition | | | 96.60 | 96.72 | 96.46 | 96.69 | 99.60 | 99.33 | 96.73 | 97.75 | 79.66 |
| Content of Viscosity Improving Agent with respect to 100 parts by mass of Coolant Composition | | | 0.24 | 0.12 | 0.39 | 0.15 | 0.13 | 0.40 | 0.01 | 1.78 | 0.08 |
| Content of Alkali Metal Compound with respect to 100 parts by mass of Coolant Composition | | | 2.96 | 2.97 | 2.96 | 2.97 | 0.28 | 0.28 | 2.97 | 0.27 | 20.02 |
| Content with respect to 100 parts by mass of Base (mmol/100g) | Viscosity Improving Agent A | | 0.5 | 0.25 | 0 | 0 | 0.25 | 0 | 0 | 0 | 0 |
| | Viscosity Improving Agent B | | 0 | 0 | 0.66 | 0.25 | 0 | 0.66 | 0.01 | 3.0 | 0.17 |
| | Alkali Metal Compound | | 11 | 11 | 11 | 11 | 1 | 1 | 11 | 1 | 90 |
| Molar Ratio of Alkali Metal Ions to Viscosity Improving Agent (Alkali Metal Ions/ Viscosity Improving Agent) | | | 45 | 89 | 34.3 | 89 | 9 | 4 | 2201 | 1.7 | 1059.8 |
| Properties | External Appearance at 25°C | | Semi-Transparent Liquid | Transparent Liquid | Semi-Transparent Liquid | Transparent Liquid | Transparent Liquid | Transparent Liquid | Transparent Liquid | Semi-Transparent Liquid | Transparent Liquid |
| | Kinetic Viscosity@25°C mm²/s | | 21 | 9 | 80 | 10 | 9 | 9 | 9 | 15 | 13 |
| | Kinetic Viscosity@100°C mm²/s | | 1 | 1 | 1 | 1 | 1 | 1 | 1 | 1 | 1 |
| Evaluation | Warm-Up Performance (Proportion of Heating Time) | | 0.9 | 0.9 | 0.8 | 0.9 | 0.9 | 0.9 | 0.9 | 0.9 | 0.9 |
| | Cooling Performance (Proportion of Cooling Time) | | 1 | 1 | 1 | 1 | 1 | 1 | 1 | 1 | 1 |

1) Rust inhibitor: benzotriazole, 2) Viscosity improving agent A: $C_{18}H_{37}O\text{-}(CH_2CH_2O)_3\text{-}SO_3Na$, 3) Viscosity improving agent B: $C_{22}H_{45}O\text{-}(CH_2CH_2O)_4\text{-}SO_3Na$, 4) Alkali metal compound: dipotassium sebacate, 5) Thickener: xanthan gum

FIG. 3

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| Mixing Amount (part(s) by mass) | Base | Ethylene Glycol | 49.8 | | 49.75 | 49.8 | 49.8 | 49.8 | 50 | 50 | 50 | 50 |
| | | Ion Exchange Water | 50 | 99.8 | 50 | 50 | 50 | 50 | 50 | 50 | 50 | 50 |
| | Rust Inhibitor[1] | | 0.2 | 0.2 | 0.2 | 0.2 | 0.2 | 0.2 | | | | |
| | Viscosity Improving Agent A[2] | | | | | | 0.05 | | | 0.13 | | |
| | Viscosity Improving Agent B[3] | | | | | 2.00 | | 0.05 | | | 0.40 | 0.40 |
| | Alkali Metal Compound[4] | | 3.06 | | 3.06 | 3.06 | 3.06 | 3.06 | | | | 27.8 |
| | Thickener[5] | | | | 0.05 | | | | | | | |
| Content of Base with respect to 100 parts by mass of Coolant Composition | | | 96.83 | 99.80 | 96.79 | 94.99 | 96.79 | 96.79 | 100 | 99.87 | 99.60 | 77.98 |
| Content of Viscosity Improving Agent with respect to 100 parts by mass of Coolant Composition | | | 0 | 0 | 0 | 1.91 | 0.05 | 0.05 | 0 | 0.13 | 0.40 | 0.31 |
| Content of Alkali Metal Compound with respect to 100 parts by mass of Coolant Composition | | | 2.97 | 0 | 2.97 | 2.92 | 2.97 | 2.97 | 0 | 0 | 0 | 21.71 |
| Content with respect to 100 parts by mass of Base (mmol/100g) | Viscosity Improving Agent A | | 0 | 0 | 0 | 0 | 0.1 | 0 | 0 | 0.25 | 0 | 0 |
| | Viscosity Improving Agent B | | 0 | 0 | 0 | 3.31 | 0 | 0.08 | 0 | 0 | 0.66 | 0.66 |
| | Alkali Metal Compound | | 11 | 0 | 11 | 11 | 11 | 11 | 0 | 0 | 0 | 100 |
| Molar Ratio of Alkali Metal Ions to Viscosity Improving Agent (Alkali Metal Ions/ Viscosity Improving Agent) | | | - | - | - | 7.7 | 221 | 276 | - | 1 | 1 | 304 |
| Properties | External Appearance at 25°C | | Transparent Liquid | Transparent Liquid | Transparent Liquid | Cloudy Paste | Transparent Liquid | Transparent Liquid | Transparent Liquid | Transparent Liquid | Transparent Liquid | Deposition |
| | Kinetic Viscosity@25°C mm$^2$/s | | 3 | 1 | 8 | 1600 | 5 | 5 | 3 | 4 | 4 | |
| | Kinetic Viscosity@100°C mm$^2$/s | | 1 | 0.3 | 2.1 | 2.1 | 1 | 1 | 1 | 1 | 1 | |
| Evaluation | Warm-Up Performance (Proportion of Heating Time) | | 1 | 1.1 | 1 | 0.5 | 1 | 1 | 1 | 1 | 1 | |
| | Cooling Performance (Proportion of Cooling Time) | | 1 | 0.9 | 1.1 | 1.1 | 1 | 1 | 1 | 1 | 1 | |

1) Rust inhibitor: benzotriazole, 2) Viscosity improving agent A: $C_{18}H_{37}O\text{-}(CH_2CH_2O)_3\text{-}SO_3Na$, 3) Viscosity improving agent B: $C_{22}H_{45}O\text{-}(CH_2CH_2O)_4\text{-}SO_3Na$, 4) Alkali metal compound: dipotassium sebacate, 5) Thickener: xanthan gum

COOLANT COMPOSITION, METHOD OF OPERATING INTERNAL COMBUSTION ENGINE USING THE SAME, AND USE OF THE SAME

CROSS REFERENCE TO RELATED APPLICATIONS

This application is a National Stage of International Application No. PCT/IB 2015/002507 filed Dec. 23, 2015, claiming priority based on Japanese Patent Application No. 2014-265468 filed Dec. 26, 2014, the contents of all of which are incorporated herein by reference in their entirety.

BACKGROUND OF THE INVENTION

1. Field of the Invention

The present invention relates to a coolant composition capable of improving the fuel efficiency of an internal combustion engine, and a method of operating an internal combustion engine using the coolant composition.

2. Description of Related Art

As a coolant for cooling an automotive engine or the like, various products are known. Among these, water is preferable because it has the highest cooling performance as the coolant for an engine. However, pure water is frozen at 0° C. or lower. Because of the above-described reason, a coolant composition is used, in which a glycol such as ethylene glycol as a base for obtaining anti-freezing properties is diluted with water to obtain a required freezing point, and various additives for preventing deterioration of metal, rubber, resins, and the like, which are used for, for example, an engine and a radiator, are optionally added thereto.

However, when a glycol such as ethylene glycol is used, there is a problem in that the viscosity of the coolant composition significantly increases, in particular, at a low temperature. Accordingly, as a technique of the related art for improving viscosity, a technique of reducing viscosity to improve fluidity at a low temperature has been disclosed (Japanese Patent Application Publication No. 8-183950 (JP 8-183950 A), Japanese Patent Application Publication No. 2010-236064 (JP 2010-236064 A), and Japanese Patent Application Publication No. 9-227859 (JP 9-227859 A)).

However, when the viscosity is reduced, the thickness of a boundary layer between a coolant and a bore wall decreases, and convection is likely to be generated. Therefore, the coolant is likely to absorb heat from the bore wall. As a result, cooling loss increases, and there is a new problem in that fuel efficiency deteriorates. On the other hand, in order to reduce cooling loss by decreasing heat radiation, a configuration of increasing the concentration of a glycol such as ethylene glycol to increase the viscosity of a coolant at a low temperature may be adopted. However, this configuration has a problem in that cooling performance at a high temperature is insufficient, which may cause overheating.

For example, Japanese Patent Application Publication No. 2011-137089 (JP 2011-137089 A), Japanese Patent Application Publication No. 2011-132285 (JP 2011-132285 A), and Japanese Patent Application Publication No. 2011-121991 (JP 2011-121991 A) disclose techniques of improving the viscosity of a lubricant by the addition of a viscosity index improving agent. However, the viscosity index improving agent disclosed herein is added in order to suppress a decrease in viscosity at a high temperature while maintaining fluidity at a low temperature. Accordingly, even when a solution to which the viscosity index improving agent is added is used as a coolant, cooling loss at a low temperature cannot be reduced, and cooling performance at a high temperature cannot be maintained.

SUMMARY OF THE INVENTION

The invention provides a coolant composition capable of improving the fuel efficiency of an internal combustion engine, and a method of operating an internal combustion engine using the coolant composition.

The present inventors have found that, when the kinetic viscosity of a coolant composition is adjusted to be within a specific range by adding at least one alkali metal compound selected from the group consisting of alkali metal salts and alkali metal hydroxides in combination with a compound represented by the following formula (1) as a viscosity improving agent, cooling loss at a low temperature can be reduced, and cooling performance at a high temperature can be maintained; as a result, the fuel efficiency of an internal combustion engine can be significantly improved. In addition, the present inventors have found that, when the kinetic viscosity of a coolant composition is adjusted to be within a specific range by adding at least one alkali metal compound selected from the group consisting of alkali metal salts and alkali metal hydroxides in combination with a compound represented by the following formula (1) as a viscosity improving agent, as compared to a case where a viscosity improving agent of the related art is used, properties that suppress crystal deposition and/or gelation at a low temperature can be imparted to a coolant.

A first aspect of the invention provides a coolant composition including: a viscosity improving agent; at least one alkali metal compound selected from the group consisting of alkali metal salts and alkali metal hydroxides; and a base, wherein the viscosity improving agent is a compound represented by a formula (1) of $R^1O-(R^2O)_m-SO_3M$. In the formula, $R^1$ represents a linear or branched alkyl group or a linear or branched alkenyl group having 16 to 24 carbon atoms, $R^2$ represents an ethylene group or a propylene group, m represents an average addition molar number of $R^2O$ and a number from 0.5 to 10, and M represents a cation or a hydrogen atom The base is formed of water and/or at least one alcohol selected from the group consisting of a monohydric alcohol, a dihydric alcohol, a trihydric alcohol, and a glycol monoalkyl ether, and a kinetic viscosity of the coolant composition is 8.5 $mm^2$/sec or higher at 25° C. and is 2.0 $mm^2$/sec or lower at 100° C.

In the first aspect, a content of the viscosity improving agent may be 0.01 mmol to 3 mmol with respect to 100 g of the base.

In the first aspect, a content of the alkali metal compound may be 0.5 mmol to 90 mmol with respect to 100 g of the base.

In the first aspect, a molar ratio of alkali metal ions to the viscosity improving agent in the coolant composition is 1.5 to 3000.

In the first aspect, the coolant composition may include a rust inhibitor.

A second aspect of the invention provides a method of operating an internal combustion engine in which the coolant composition according to the first aspect is used as a coolant.

A third aspect of the invention provides a use of the coolant composition according to the first aspect as a coolant of an internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 shows the results of measuring the kinetic viscosity, warm-up performance, and cooling performance of each of the coolant compositions obtained in Examples 1 to 9.

FIG. 3 shows the results of measuring the kinetic viscosity, warm-up performance, and cooling performance of each of the coolant compositions obtained in Comparative Examples 1 to 10.

DETAILED DESCRIPTION OF EMBODIMENTS

Figure 1:
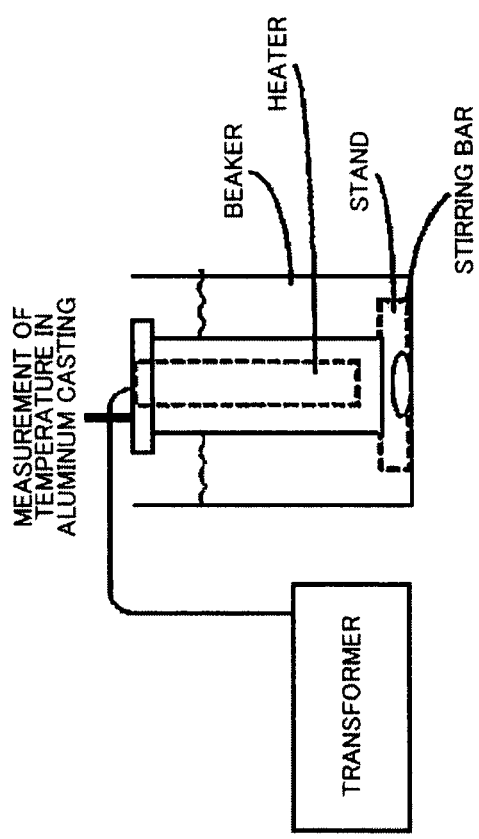
FIG. 1 is a schematic diagram showing an apparatus for evaluating warm-up performance and cooling performance used in Examples.

A coolant composition according to an embodiment of the invention contains a compound represented by the following formula (1), which is a viscosity improving agent, and an alkali metal compound. As a result, this coolant composition has a predetermined range of kinetic viscosity at a low temperature and a high temperature. In the present invention, the low temperature refers to 25° C., and the high temperature refers to 100° C. In the coolant composition according to the embodiment of the invention, various viscosity improving agents may be used alone or in a combination of two or more kinds.

The viscosity improving agent used in the coolant composition according to the embodiment of the invention is a compound represented by the following formula (1) of $R^1O$—$(R^2O)_m$—$SO_3M$ (where $R^1$ represents a linear or branched alkyl group or a linear or branched alkenyl group having 16 to 24 carbon atoms, $R^2$ represents an ethylene group or a propylene group, m represents an average addition molar number of $R^2O$ and a number of 0.5 to 10, and M represents a cation or a hydrogen atom).

Regarding $R^1$, the alkyl group may be linear or branched. However, from the viewpoint of exhibiting a specific kinetic viscosity at the low temperature and the high temperature, it is preferable that the alkyl group is linear. The number of carbon atoms in the alkyl group is 16 to 24, preferably 18 to 22, and more preferably 20 to 22.

Specific examples of $R^1$ include alkyl groups such as a cetyl group, a margaryl group, an isostearyl group, a 2-heptylundecyl group, a stearyl group, an arachidyl group, a behenyl group, and a lignoceryl group; and alkenyl group such as an oleyl group. Among these, a cetyl group, a stearyl group, or a behenyl group is preferable, and a behenyl group is more preferable.

$R^2$ represents an ethylene group or a propylene group. However, from the viewpoint of exhibiting a specific kinetic viscosity at the low temperature and the high temperature, it is preferable that $R^2$ represents an ethylene group.

m represents an average addition molar number of $R^2O$. From the viewpoint of exhibiting a specific kinetic viscosity at the low temperature and the high temperature, m represents a number of 0.5 to 10, preferably a number of 1 to 8, more preferably a number of 2 to 7, and still more preferably a number of 3 to 6.

M represents a cation or a hydrogen atom, but it is preferable that M represents a cation. Specific examples of the cation include alkali metal ions and ammonium ions, and specific examples of the alkali metal include lithium, sodium, and potassium. Among these, sodium or potassium is preferable.

In the compound represented by the formula (1) according to the embodiment of the invention, it is preferable that $R^1$ represents a linear alkyl group having 18 to 22 carbon atoms, $R^2$ represents an ethylene group, m represents an average addition molar number of $R^2O$ and a number of 1 to 8, and M represents a sodium ion or a potassium ion.

In the compound represented by the formula (1) according to the embodiment of the invention, it is more preferable that $R^1$ represents a linear alkyl group having 20 to 22 carbon atoms, $R^2$ represents an ethylene group, m represents an average addition molar number of $R^2O$ and a number of 2 to 7, and M represents a sodium ion or a potassium ion. In the compound represented by the formula (1) according to the embodiment of the invention, it is still more preferable that $R^1$ represents a linear alkyl group having 20 to 22 carbon atoms, $R^2$ represents an ethylene group, m represents an average addition molar number of $R^2O$ and a number of 3 to 6, and M represents a sodium ion or a potassium ion.

Specific examples of the compound represented by the formula (1) include $C_{18}H_{37}O$—$(CH_2CH_2O)_3$—$SO_3Na$, $C_{18}H_{37}O$—$(CH_2CH_2O)_3$—$SO_3K$, $C_{22}H_{45}O$—$(CH_2CH_2O)_4$—$SO_3Na$, and $C_{22}H_{45}O$—$(CH_2CH_2O)_4$—$SO_3K$.

The alkali metal compound used in the coolant composition according to the embodiment of the invention is at least one compound selected from the group consisting of alkali metal salts and alkali metal hydroxides. The alkali metal salts exclude the compound represented by the formula (1). Examples of the alkali metal include sodium, potassium, and lithium. Examples of the alkali metal salts include alkali metal salts of organic or inorganic acids and alkali metal salts of triazole or thiazole. Examples of the alkali metal salts of inorganic acids include alkali metal salts of nitrous acid such as sodium nitrite and potassium nitrite; alkali metal salts of nitric acid such as sodium nitrate and potassium nitrate; alkali metal salts of molybdic acid such as sodium molybdate and potassium molybdate; alkali metal salts of hypochlorous acid such as sodium hypochlorite and potassium hypochlorite; alkali metal salts of sulfuric acid such as sodium sulfate and potassium sulfate; alkali metal salts of carbonic acid such as sodium carbonate and potassium carbonate; alkali metal salts of hydrochloric acid such as sodium chloride and potassium chloride; alkali metal salts of phosphoric acid such as sodium phosphate and potassium phosphate; alkali metal salts of silicic acid such as sodium silicate and potassium silicate; and alkali metal salts of boric acid such as sodium borate and potassium borate. Examples of the alkali metal salts of organic acids include alkali metal salts of aromatic carboxylic acids such as benzoic acid, p-toluic acid, and p-tert-butylbenzoic acid; alkali metal salts of aliphatic monocarboxylic acids such as pentanoic acid, hexanoic acid, heptanoic acid, octanoic acid, 2-ethyl hexanoic acid, nonanoic acid, decanoic acid, undecanoic acid, dodecanoic acid, and oleic acid; and alkali metal salt of aliphatic polycarboxylic acids such as azelaic acid, sebacic acid, undecanedioic acid, dodecanedioic acid, and citric acid. Examples of the alkali metal salts of triazole or thiazole include an alkali metal salt of benzotriazole. Among the above-described alkali metal salts, from the viewpoint of adjusting the kinetic viscosity of the coolant composition at the low temperature and the high temperature to be within the predetermined range, an alkali metal salt of an aliphatic polycarboxylic acid is preferable, and dipotassium sebacate is more preferable. When being used as a rust inhibitor, the alkali metal salt is also used as the alkali metal compound.

In this case, it is not necessary that another alkali metal compound is separately added.

The alkali metal hydroxide used in the coolant composition according to the embodiment of the invention is not particularly limited. Specific examples of the alkali metal hydroxide include lithium hydroxide, sodium hydroxide, and potassium hydroxide. Among the above-described alkali metal hydroxides, from the viewpoint of adjusting the kinetic viscosity of the coolant composition at the low temperature and the high temperature to be within the predetermined range, potassium hydroxide is preferable.

As described above, the coolant according to the embodiment of the invention contains: the viscosity improving agent which is the compound represented by the formula (1); and at least one alkali metal compound selected from the group consisting of alkali metal salts and alkali metal hydroxides. As a result, the kinetic viscosity can be adjusted to be within the predetermined range. The kinetic viscosity at 25° C. can be adjusted to be high using, for example, a method of increasing the content of the viscosity improving agent, a method of adjusting the content of the alkali metal compound, and, when the base contains an alcohol, a method of increasing the content of the alcohol. The kinetic viscosity at 100° C. can be adjusted to be low using, for example, a method of decreasing the content of the viscosity improving agent, a method of adjusting the content of the alkali metal compound, and, when the base contains an alcohol, a method of decreasing the content of the alcohol.

From the viewpoint of adjusting the kinetic viscosity of the coolant composition at the low temperature and the high temperature to be within the predetermined range, the content of the viscosity improving agent with respect to the base described below (with respect to 100 g) is preferably 0.01 mmol or higher, more preferably 0.05 mmol or higher, still more preferably 0.1 mmol or higher, still more preferably 0.15 mmol or higher, still more preferably 0.2 mmol or higher, still more preferably 0.25 mmol or higher, still more preferably 0.3 mmol or higher, and still more preferably 0.4 mmol or higher. From the viewpoints of improving cooling performance and suppressing semi-solidification, the content of the viscosity improving agent is preferably 3 mmol or lower, more preferably 2 mmol or lower, still more preferably 1 mmol or lower, and still more preferably 0.8 mmol or lower. From the these points of view, the content of the viscosity improving agent is preferably 0.01 mmol to 3 mmol, more preferably 0.15 mmol to 3 mmol, still more preferably 0.2 mmol to 2 mmol, still more preferably 0.2 mmol to 1 mmol, still more preferably 0.25 mmol to 0.8 mmol, still more preferably 0.3 mmol to 0.8 mmol, and still more preferably 0.4 mmol to 0.8 mmol. When a rust inhibitor is used, it is preferable the content of the viscosity improving agent is adjusted to be within the above-described range with respect to the total amount of the base and the rust inhibitor (with respect to 100 g).

From the viewpoint of adjusting the kinetic viscosity of the coolant composition at the low temperature and the high temperature to be within the predetermined range, the content of the viscosity improving agent with respect to 100 parts by mass of the coolant composition according to the embodiment of the invention is preferably 0.005 parts by mass or higher, more preferably 0.01 parts by mass or higher, still more preferably 0.05 parts by mass or higher, still more preferably 0.08 parts by mass or higher, still more preferably 0.1 parts by mass or higher, and still more preferably 0.2 parts by mass or higher. From the viewpoints of improving cooling performance and suppressing semi-solidification, the content of the viscosity improving agent is preferably 3 parts by mass or lower, more preferably 1.8 parts by mass or lower, still more preferably 1 part by mass or lower, and still more preferably 0.6 parts by mass or lower. From these points of view, the content of the viscosity improving agent is preferably 0.005 parts by mass to 3 parts by mass, more preferably 0.01 parts by mass to 1.8 parts by mass, still more preferably 0.08 parts by mass to 1 part by mass, still more preferably 0.1 parts by mass to 0.6 parts by mass, and still more preferably 0.2 parts by mass to 0.6 parts by mass.

When the alkali metal compound is used in combination with the viscosity improving agent, from the viewpoint of adjusting the kinetic viscosity of the coolant composition at the low temperature and the high temperature to be within the predetermined range, the content of the alkali metal compound with respect to the base described below (with respect to 100 g) is preferably 0.5 mmol or higher, more preferably 1.0 mmol or higher, still more preferably 1.5 mmol or higher, still more preferably 3 mmol or higher, and still more preferably 5 mmol or higher. From the viewpoints of improving cooling performance and suppressing deposition, the content of the alkali metal compound is preferably 90 mmol or lower, more preferably 70 mmol or lower, still more preferably 45 mmol or lower, still more preferably 20 mmol or lower, and still more preferably 15 mmol or lower. From these points of view, the content of the alkali metal compound is preferably 0.5 mmol to 90 mmol, more preferably 1 mmol to 90 mmol, still more preferably 1 mmol to 70 mmol, still more preferably 1 mmol to 45 mmol, still more preferably 1.5 mmol to 20 mmol, still more preferably 3 mmol to 20 mmol, and still more preferably 5 mmol to 15 mmol. When a rust inhibitor is used, it is preferable the content of the alkali metal compound is adjusted to be within the above-described range with respect to the total amount of the base and the rust inhibitor (with respect to 100 g).

When the alkali metal compound is used in combination with $C_{18}H_{37}O-(CH_2CH_2O)_3-SO_3Na$ or $C_{18}H_{37}O-(CH_2CH_2O)_3-SO_3K$ which is the viscosity improving agent, the content of the alkali metal compound is preferably 1.0 mmol to 45 mmol with respect to the base described below (with respect to 100 g). When the alkali metal compound is used in combination with $C_{22}H_{45}O-(CH_2CH_2O)_4-SO_3Na$ or $C_{22}H_{45}O-(CH_2CH_2O)_4-SO_3K$ which is the viscosity improving agent, the content of the alkali metal compound is preferably 1.0 mmol to 90 mmol with respect to the base described below (with respect to 100 g). When the alkali metal salt and the alkali metal hydroxide are used together, the content of the alkali metal compound refers to the total molar number. When the alkali metal compound is used as a rust inhibitor, the content of the rust inhibitor is calculated as the content of the alkali metal compound.

When the alkali metal compound is used in combination with the viscosity improving agent, from the viewpoint of adjusting the kinetic viscosity of the coolant composition at the low temperature and the high temperature to be within the predetermined range, the content of the alkali metal compound with respect to 100 parts by mass of the coolant composition according to the embodiment of the invention is preferably 0.01 parts by mass or higher, more preferably 0.02 parts by mass or higher, still more preferably 0.03 parts by mass or higher, still more preferably 0.05 parts by mass or higher, still more preferably 0.1 parts by mass or higher, still more preferably 0.25 parts by mass or higher, still more preferably 0.5 parts by mass or higher, and still more preferably 1 part by mass or higher. From the viewpoints of improving cooling performance and suppressing deposition, the content of the alkali metal compound is preferably 30 parts by mass or lower, more preferably 21 parts by mass or lower, more preferably 20 parts by mass or lower, still more preferably 10 parts by mass or lower, still more preferably 7 parts by mass or lower, and still more preferably 5 parts by mass or lower. From these points of view, the content of the alkali metal compound is preferably 0.01 parts by mass to 30 parts by mass, more preferably 0.01 parts by mass to 20 parts by mass, still more preferably 0.02 parts by mass to 10 parts by mass, still more preferably 0.03 parts by mass to 10 parts by mass, still more preferably 0.05 parts by mass to 7 parts by mass, still more preferably 0.1 parts by mass to 7 parts by mass, still more preferably 0.5 parts by mass to 7 parts by mass, still more preferably 1 part by mass to 7 parts by mass, and still more preferably 1 part by mass to 5 parts by mass. When the alkali metal compound is used as a rust inhibitor, the content of the rust inhibitor is calculated as the content of the alkali metal compound.

From the viewpoint of adjusting the kinetic viscosity of the coolant composition at the low temperature and the high temperature to be within the predetermined range, a molar ratio of the alkali metal ions to the viscosity improving agent (alkali metal ions/viscosity improving agent) in the coolant composition according to the embodiment of the invention is preferably 1.5 or higher, more preferably 2.5 or higher, still more preferably 3 or higher, still more preferably 5 or higher, still more preferably 10 or higher, still more preferably 20 or higher, still more preferably 30 or higher, and still more preferably 50 or higher. From the same point of view, the molar ratio is preferably 3000 or lower, more preferably 2500 or lower, still more preferably 2000 or lower, still more preferably 1500 or lower, still more preferably 1100 or lower, still more preferably 1000 or lower, still more preferably 700 or lower, still more preferably 500 or lower, still more preferably 300 or lower, still more preferably 200 or lower, and still more preferably 100 or lower. From this point of view, the molar ratio is preferably 1.5 to 3000, more preferably 2.5 to 3000, still more preferably 3 to 2500, still more preferably 5 to 2000, still more preferably 5 to 1500, still more preferably 10 to 1000, still more preferably 10 to 700, still more preferably 20 to 500, still more preferably 30 to 300, still more preferably 30 to 200, still more preferably 30 to 100, and still more preferably 50 to 100.

When plural kinds of alkali metals are present, the molar number of the alkali metal ions refers to the total molar number of the respective alkali metals. The alkali metal ions refer to ions of all the alkali metals in the coolant and includes not only the alkali metal ions derived from the alkali metal compound but also alkali metal ions derived from the viscosity improving agent and alkali metal ions derived from another optional component such as a rust inhibitor. When the viscosity improving agent is a mixture, the molar number of the viscosity improving agent refers to the total molar number of respective components in the mixture.

In the coolant composition according to the embodiment of the invention, the kinetic viscosity may be 8.5 mm$^2$/sec or higher at 25° C. and may be 2.0 mm$^2$/sec or lower at 100° C.

In the coolant composition according to the embodiment of the invention, from the viewpoint of suppressing cooling loss at the low temperature, the kinetic viscosity at 25° C. is 8.5 mm$^2$/sec or higher. From the viewpoints of preventing a load on a water pump and suppressing deterioration in the fuel efficiency of an internal combustion engine, the kinetic viscosity at 25° C. is preferably 3000 mm$^2$/sec or lower. From these points of view, the kinetic viscosity at 25° C. is preferably 8.5 mm$^2$/sec to 3000 mm$^2$/sec, more preferably 9 mm$^2$/sec to 2000 mm$^2$/sec, and still more preferably 50 mm$^2$/sec to 1000 mm$^2$/sec.

From the viewpoints of maintaining cooling performance at the high temperature and preventing overheating, in the coolant composition according to the embodiment of the invention, the kinetic viscosity at 100° C. is 2.0 mm$^2$/sec or lower, preferably 0.3 mm$^2$/sec to 2.0 mm$^2$/sec, and more preferably 0.4 mm$^2$/sec to 1.8 mm$^2$/sec. The cooling performance of the coolant composition can be evaluated, for example, by evaluating a radiator heat transmittance. When the coolant consists of 100% of water, the kinetic viscosity at 100° C. is 0.3 mm$^2$/sec.

The coolant composition according to the embodiment of the invention contains a base. The base used in the coolant composition according to the invention is formed of water and/or at least one alcohol selected from the group consisting of alcohols such as a monohydric alcohol, a dihydric alcohol, and a trihydric alcohol, and a glycol monoalkyl ether.

It is preferable that the coolant composition according to the embodiment of the invention contains a base having anti-freezing properties. However, when anti-freezing properties are not required, the base may consist of only water.

Examples of the monohydric alcohol include monohydric alcohols having preferably 1 to 8 and more preferably 1 to 3 carbon atoms such as methanol, ethanol, propanol, butanol, pentanol, hexanol, heptanol, and octanol. Among these, one kind may be used alone, or a mixture of two or more kinds may be used.

Examples of the dihydric alcohol include dihydric alcohols having preferably 2 to 8 and more preferably 2 to 3 carbon atoms such as ethylene glycol, diethylene glycol, triethylene glycol, propylene glycol, 1,3-propanediol, 1-4-butanediol, 1-3-butanediol, 1,5-pentanediol, and hexylene glycol. Among these, one kind may be used alone, or a mixture of two or more kinds may be used.

Examples of the trihydric alcohol include trihydric alcohols having preferably 3 to 6 and more preferably 3 carbon atoms such as glycerin, trimethylolethane, trimethylolpropane, 5-methyl-1,2,4-heptanetriol, and 1,2,6-hexanetriol. Among these, one kind may be used alone, or a mixture of two or more kinds may be used.

The number of carbon atoms in the alkyl group of the glycol monoalkyl ether is preferably 1 to 4, more preferably 1 to 2. The number of carbon atoms in the glycol is preferably 2 to 6 and more preferably 2. Specific examples of the glycol monoalkyl ether include ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether. Among these, one kind may be used alone, or a mixture of two or more kinds may be used.

Among the bases, ethylene glycol, propylene glycol, or 1,3-propanediol is preferable from the viewpoints of handleability, price, and availability.

Therefore, it is preferable that the base contains at least one compound selected from the group consisting of ethylene glycol, propylene glycol, 1,3-propanediol, and water. It is more preferable that the base contains ethylene glycol and water. As water used as the base, ion exchange water is preferable.

From the viewpoint of functioning as a coolant, the content of the base with respect to 100 parts by mass of the coolant composition according to the embodiment of the invention is preferably 50 parts by mass or higher, more preferably 75 parts by mass or higher, still more preferably 80 parts by mass or higher, and still more preferably 90 parts by mass or higher. From the viewpoint of adding the viscosity improving agent or the alkali metal compound, the content of the base is preferably 99.92 parts by mass or lower, more preferably 99.9 parts by mass or lower, still more preferably 99 parts by mass or lower, and still more preferably 98 parts by mass or lower. Accordingly, the content of the base with respect to 100 parts by mass of the coolant composition according to the embodiment of the invention is preferably 50 parts by mass to 99.92 parts by mass, more preferably 80 parts by mass to 99.9 parts by mass, still more preferably 90 parts by mass to 99.9 parts by mass, still more preferably 90 parts by mass to 99 parts by mass, and still more preferably 90 parts by mass to 98 parts by mass.

Regarding the content of the alcohol with respect to 100 parts by mass of the coolant composition according to the embodiment of the invention, in consideration of anti-freezing properties, the content of ethylene glycol is preferably 1 part by mass to 99.85 parts by mass, more preferably 10 parts by mass to 95 parts by mass, still more preferably 25 parts by mass to 89 parts by mass, and still more preferably 25 parts by mass to 74 parts by mass.

The content of water with respect to 100 parts by mass of the coolant composition according to the embodiment of the invention is preferably 0.1 parts by mass to 99.85 parts by mass, more preferably 0.3 parts by mass to 95 parts by mass, still more preferably 10 parts by mass to 74 parts by mass, and still more preferably 25 parts by mass to 74 parts by mass.

When the base contains water and the alcohol, a mixing ratio of water to the alcohol can be appropriately adjusted in consideration of anti-freezing properties and inflammability. From the viewpoint of preventing having a flash point, the mass ratio (water:alcohol) of water to the alcohol in the base is preferably 20:80 to 90:10 and more preferably 40:60 to 75:25.

It is preferable that the coolant composition according to the embodiment of the invention is obtained by mixing the following components with each other, the components including: the base; the viscosity improving agent; at least one alkali metal compound selected from the group consisting of alkali metal salts and alkali metal hydroxides; optionally the rust inhibitor; and optionally additives other than the rust inhibitor. It is more preferable that, after being mixed, the components are heated to a temperature (preferably 60° C. or higher and more preferably 80° C. or higher; preferably 100° C. or lower), are optionally stirred and dissolved, and then are cooled to room temperature (20° C.).

In order to efficiently suppress corrosion of metal used in an engine coolant passage, the coolant composition according to the embodiment of the invention may contain at least one or more rust inhibitors within a range where the kinetic viscosity is not affected. Examples of the rust inhibitor include phosphoric acid and/or salts thereof; aliphatic carboxylic acids and/or salts thereof; aromatic carboxylic acids and/or salts thereof; triazoles; thiazoles; silicates; nitrates; nitrites; borates; molybdates; and amine salts. Among these, one kind may be used alone, or a mixture of two or more kinds may be used. The content of the rust inhibitor with respect to 100 parts by mass of the coolant composition is preferably 0.01 parts by mass to 25 parts by mass, more preferably 0.05 parts by mass to 15 parts by mass, still more preferably 0.1 parts by mass to 10 parts by mass, and still more preferably 0.1 parts by mass to 5 parts by mass.

In the coolant composition according to the embodiment of the invention, optionally, additives other than the viscosity improving agent can be added to the base within a range where the effects of the invention do not deteriorate. Examples of the additives include a pH adjuster, a defoaming agent, a colorant, and a bittering agent. The total mixing amount of the additives is typically 10 parts by mass or less and preferably 5 parts by mass or less with respect to 100 parts by mass of the composition.

The pH of the coolant composition according to the invention at 25° C. is preferably 6 or higher and more preferably 7 or higher and is preferably 10 or lower and more preferably 9 or lower.

In general, the coolant composition according to the embodiment of the invention can be used as a coolant and is preferably used as a coolant for an internal combustion engine. Therefore, according to the invention, there is provided a method of operating an internal combustion engine in which the coolant composition according to the embodiment of the invention is used as a coolant (hereinafter, also referred to as "method of operating an internal combustion engine according to the embodiment of the invention"). In the method of operating an internal combustion engine according to the embodiment of the invention, the fuel efficiency of an internal combustion engine can be improved. The coolant composition according to the embodiment of the invention can be used as a coolant of a battery stack, a fuel cell stack, or the like.

According to an embodiment of the invention, there is provided a concentrated composition for obtaining the coolant composition. The concentrated composition according to the embodiment of the invention contains the viscosity improving agent and the base and may further contain the alkali metal compound or the like. The concentration of the viscosity improving agent in the concentrated composition can be made to be higher than that in a case where the viscosity improving agent is used for a coolant. The concentration of the viscosity improving agent is diluted to 1/2 to 1/100 by adding a residual base and, optionally, other additives to the concentrated composition according to the invention. As a result, the coolant composition according to the embodiment of the invention can be obtained.

The base contained in the concentrated composition according to the embodiment of the invention may be the same as or different from the base which is additionally added to obtain the coolant composition. For example, after the concentrated composition is initially obtained as the base using an alcohol such as ethylene glycol, the obtained concentrated composition may be diluted by adding water as the residual base. The content of the viscosity improving agent with respect to 100 parts by mass of the concentrated composition according to the invention is preferably 0.1 parts by mass to 99 parts by mass, more preferably 1 part by mass to 90 parts by mass, and still more preferably 3 parts by mass to 50 parts by mass. The content of the base with respect to 100 parts by mass of the concentrated composition according to the invention is preferably 1 part by mass to 99.9 parts by mass, more preferably 50 part by mass to 99 parts by mass, and still more preferably 70 parts by mass to 95 parts by mass. Hereinafter, the invention will be described in more detail using Examples. However, the invention is not limited to the range of Examples.

Hereinafter, Examples of the invention will be described. In Example 1, 49.8 parts by mass of ethylene glycol and 50 parts by mass of ion exchange water were mixed with each other, and then 0.2 parts by mass of benzotriazole as a rust inhibitor, 0.25 parts by mass of viscosity improving agent A ($C_{18}H_{37}O$—$(CH_2CH_2O)_3$—$SO_3Na$), and 3.06 parts by mass of dipotassium sebacate as an alkali metal compound were added thereto to obtain a mixture. Next, this mixture was heated to 80° C., was stirred for 30 minutes, and was cooled to room temperature under stirring. As a result, a coolant composition was obtained.

With respect to the base (with respect to 100 g), the content of viscosity improving agent A ($C_{18}H_{37}O$—$(CH_2CH_2O)_3$—$SO_3Na$) was 0.5 mmol, and the content of dipotassium sebacate as the alkali metal compound was 11 mmol.

With respect to 100 parts by mass of the coolant composition, the content of the alkali metal compound was 2.96 parts by mass, and the content of the viscosity improving agent was 0.24 parts by mass.

As alkali metal ions, not only alkali metal ions derived from the alkali metal compound but also alkali metal ions derived from the viscosity improving agent were included. Accordingly, a molar ratio of the alkali metal ions to the viscosity improving agent (alkali metal ions/viscosity improving agent) was $(11 \times 2 + 0.5)/0.5 = 45$.

In Example 2, a coolant composition was obtained using the same method as in Example 1, except that 0.25 mmol of viscosity improving agent A was used instead of 0.5 mmol of viscosity improving agent A.

In Example 3, a coolant composition was obtained using the same method as in Example 1, except that 0.66 mmol of viscosity improving agent B ($C_{22}H_{45}O$—$(CH_2CH_2O)_4$—$SO_3Na$) was used instead of 0.5 mmol of viscosity improving agent A.

In Example 4, a coolant composition was obtained using the same method as in Example 1, except that 0.25 mmol of viscosity improving agent B was used instead of 0.5 mmol of viscosity improving agent B.

In Example 5, a coolant composition was obtained using the same method as in Example 1, except that 50 parts by mass of ethylene glycol was used instead of 49.8 parts by mass of ethylene glycol; 1 mmol of the alkali metal compound and 0.25 mmol of viscosity improving agent A were used; and the rust inhibitor was not used.

In Example 6, a coolant composition was obtained using the same method as in Example 1, except that: 50 parts by mass of ethylene glycol was used instead of 49.8 parts by mass of ethylene glycol; 1 mmol of the alkali metal compound and 0.66 mmol of viscosity improving agent B were used; and the rust inhibitor was not used.

In Example 7, a coolant composition was obtained using the same method as in Example 1, except that: 79.7 parts by mass of ethylene glycol, 20 parts by mass of ion exchange water, and 0.3 parts by mass of the rust inhibitor were used; and 11 mmol of the alkali metal compound and 0.01 mmol of viscosity improving agent B were used.

In Example 8, a coolant composition was obtained using the same method as in Example 1, except that 1 mmol of the alkali metal compound and 3.0 mmol of viscosity improving agent B were used.

In Example 9, a coolant composition was obtained using the same method as in Example 1, except that: 79.7 parts by mass of ethylene glycol, 20 parts by mass of ion exchange water, and 0.3 parts by mass of the rust inhibitor were used; and 90 mmol of the alkali metal compound and 0.17 mmol of viscosity improving agent B were used.

Hereinafter, Comparative Examples will be described. In Comparative Example 1, a coolant composition was obtained using the same method as in Example 1, except that viscosity improving agent A was not used. The coolant composition of Comparative Example 1 corresponds to a coolant of the related art containing 50% of ethylene glycol and was set as a reference for evaluating warm-up performance and cooling performance.

In Comparative Example 2, 0.2 parts by mass of benzotriazole as a rust inhibitor was added to 99.8 parts by mass of ion exchange water, and the components were mixed with each other. The coolant composition of Comparative Example 2 corresponds to a coolant of the related art having high cooling performance in which water was used as a base.

In Comparative Example 3, a coolant composition was obtained using the same method as in Example 1, except that: 49.75 parts by mass of ethylene glycol was used instead of 49.8 parts by mass of ethylene glycol; and 0.05 parts by mass of xanthan gum (manufactured by Sansho Co., Ltd.) was used instead of 0.5 mmol of viscosity improving agent A.

In Comparative Example 4, a coolant composition was obtained using the same method as in Example 1, except that 3.31 mmol of viscosity improving agent B was used instead of 0.5 mmol of viscosity improving agent A.

In Comparative Example 5, a coolant composition was obtained using the same method as in Example 1, except that 0.1 mmol of viscosity improving agent A was used instead of 0.5 mmol of viscosity improving agent A.

In Comparative Example 6, a coolant composition was obtained using the same method as in Example 1, except that 0.08 mmol of viscosity improving agent B was used instead of 0.5 mmol of viscosity improving agent A.

In Comparative Example 7, 50 parts by mass of ethylene glycol and 50 parts by mass of ion exchange water were mixed with each other.

In Comparative Example 8, a coolant composition was obtained using the same method as in Example 1, except that: 50 parts by mass of ethylene glycol was used instead of 49.8 parts by mass of ethylene glycol; 0.25 mmol of viscosity improving agent A was used instead of 0.5 mmol of viscosity improving agent A; and the alkali metal compound and the rust inhibitor were not used.

In Comparative Example 9, a coolant composition was obtained using the same method as in Example 1, except that: 50 parts by mass of ethylene glycol was used instead of 49.8 parts by mass of ethylene glycol; 0.66 mmol of viscosity improving agent B was used instead of 0.5 mmol of viscosity improving agent A; and the alkali metal compound and the rust inhibitor were not used.

In Comparative Example 10, a coolant composition was obtained using the same method as in Example 1, except that: 50 parts by mass of ethylene glycol was used instead of 49.8 parts by mass of ethylene glycol; 100 mmol of the alkali metal compound was used instead of 11 mmol of the alkali metal compound; 0.66 mmol of viscosity improving agent B was used instead of 0.5 mmol of viscosity improving agent A; and the rust inhibitor was not used.

The external appearance of each of the coolant compositions obtained in Examples 1 to 9 and Comparative Example 1 to 10 was observed by visual inspection at 25° C. The kinetic viscosity of each of the coolant compositions obtained in Examples 1 to 9 and Comparative Examples 1 to 10 was measured at 25° C. and 100° C., and heat characteristics (warm-up performance and cooling performance) were evaluated. The results are shown in FIG. 2 and FIG. 3.

The external appearance was evaluated by visual inspection based on the following criteria. That is, "Transparent Liquid" refers to a state where precipitation, foreign matter, or the like was not observed; "Semi-Transparent Liquid" refers to a state where the liquid flew at normal temperature; "Cloudy Paste" refers to a state where the liquid did not flow at normal temperature; and "Deposition" refers to a state where solid crystals were observed in the liquid by visual inspection.

The kinetic viscosity was measured using the following method. The kinetic viscosity of the coolant composition at 25° C. and 100° C. was measured according to a test method in which a glass capillary viscometer defined in JIS K 2283 or ASTM D445 and D446 was used. Specifically, the measurement was performed using the following method. (1) A predetermined amount of sample was put into a Ubbelohde viscometer defined in JIS K 2283 while tilting the viscometer so as to prevent penetration of bubbles. (2) The temperature of the viscometer into which the sample was put was controlled at a thermostatic water bath for 15 minutes. (3) The sample was suctioned to the top of a measurement reference line and was caused to fall freely. At this time, the time during which the meniscus reached the bottom of the measurement reference line from the top thereof was measured. (4) When the measurement time was shorter than 200 seconds, the operations (1) to (3) were repeated after replacing the viscometer with another one. (5) The measurement was performed twice using a viscometer for a measurement time of 200 seconds or longer. When a difference in the measurement time was within 0.2% of the average value, the kinetic viscosity was calculated based on the average measurement time and the viscometer constant of the viscometer used.

For the evaluation of warm-up performance, the time during which aluminum casting was heated from 25° C. to 60° C. was measured using a simple tester for evaluating heat characteristics (refer to FIG. 1) at a room temperature of 25° C. The result (240 seconds) of Comparative Example 1 was set as a reference value (1.0).

For the evaluation of cooling performance, the time during which aluminum casting was cooled from 90° C. to 80° C. was measured using a simple tester for evaluating heat characteristics (refer to FIG. 1) at a room temperature of 25° C. The result (300 seconds) of Comparative Example 1 was set as a reference value (1.0).

FIG. 2 and FIG. 3 shows the results of measuring the kinetic viscosity, warm-up performance, and cooling performance of each of the coolant compositions obtained in Examples 1 to 9 and Comparative Examples 1 to 10.

The following results were obtained from FIG. 2 and FIG. 3. In the coolant compositions of Examples 1 to 9, the kinetic viscosity at the low temperature was high, and a decrease in the kinetic viscosity at the high temperature was sufficient. Therefore, as compared to the coolant composition of Comparative Example 1, the warm-up performance was improved, and the cooling performance was maintained. In all the coolant compositions of Examples 1 to 9, deposition did not occur, and the liquid was not a cloudy paste but a transparent or semi-transparent liquid.

In the coolant composition of Comparative Example 3 in which xanthan gum as a general thickener was used, a decrease in the kinetic viscosity at the high temperature was small, and the cooling performance was poor. On the other hand, in the coolant composition of Comparative Example 2, the cooling performance was high; however, the kinetic viscosity at the low temperature was low and the warm-up performance was poor.

In the coolant composition of Comparative Example 4, the warm-up performance was improved; however, the cooling performance was poor, and the viscosity was high enough to cause semi-solidification. Therefore, a load on a water pump was high, and the fuel efficiency of an internal combustion engine was poor.

In the coolant compositions of Comparative Examples 5 to 9, the warm-up performance was not improved due to insufficient thickening. In the coolant composition of Comparative Example 10, the alkali metal compound was deposited.

The coolant composition according to the invention is preferably used for cooling an internal combustion engine (including a hybrid system) of a vehicle such as an automobile or a working vehicle (for example, a truck or a heavy machinery) a ship, an airplane, a power generator, or a heating and cooling system and for cooling a battery or a fuel cell.

The invention claimed is:

1. A coolant composition comprising:
a viscosity improving agent;
at least one alkali metal compound selected from the group consisting of alkali metal salts and alkali metal hydroxides; and
a base, wherein
the viscosity improving agent is a compound represented by a formula of

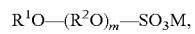

$R^1O-(R^2O)_m-SO_3M$, where $R^1$ represents a linear or branched alkyl group or a linear or branched alkenyl group having 22 to 24 carbon atoms, $R^2$ represents an ethylene group or a propylene group, m represents an average addition molar number of $R^2O$ and a number from 0.5 to 10, and M represents a cation or a hydrogen atom,
the base is formed of water and/or at least one alcohol selected from the group consisting of a monohydric alcohol, a dihydric alcohol, a trihydric alcohol, and a glycol monoalkyl ether, and
a kinetic viscosity of the coolant composition is 8.5 mm²/sec or higher at 25° C. and is 2.0 mm²/sec or lower at 100° C.

2. The coolant composition according to claim 1, wherein a content of the viscosity improving agent is 0.01 mmol to 3 mmol with respect to 100 g of the base.

3. The coolant composition according to claim 1, wherein a content of the alkali metal compound is 0.5 mmol to 90 mmol with respect to 100 g of the base.

4. The coolant composition according to claim 1, wherein a molar ratio of alkali metal ions to the viscosity improving agent in the coolant composition is 1.5 to 3000.

5. The coolant composition according to claim 1, further comprising
a rust inhibitor.

6. A method of operating an internal combustion engine, wherein the coolant composition according to claim 1 is used as a coolant.

7. The coolant composition according to claim 1, wherein the alkali metal compound is dipotassium sebacate.

8. A coolant composition comprising:
a viscosity improving agent;
at least one alkali metal compound selected from the group consisting of alkali metal salts and alkali metal hydroxides; and
a base, wherein
the viscosity improving agent is at least one compound selected from the group consisting of $C_{18}H_{37}O-(CH_2CH_2O)_3-SO_3Na$, $C_{18}H_{37}O-(CH_2CH_2O)_3-SO_3K$, $C_{22}H_{45}O-(CH_2CH_2O)_4-SO_3Na$, and $C_{22}H_{45}O-(CH_2CH_2O)_4-SO_3K$, the base is formed of water and/or at least one alcohol selected from the group consisting of a monohydric alcohol, a dihydric alcohol, a trihydric alcohol, and a glycol monoalkyl ether, and a kinetic viscosity of the coolant composition is 8.5 mm$^2$/sec or higher at 25° C. and is 2.0 mm$^2$/sec or lower at 100° C.

9. The coolant composition according to claim 8, wherein the viscosity improving agent is $C_{22}H_{45}O$—$(CH_2CH_2O)_4$—$SO_3Na$ and/or $C_{22}H_{45}O$—$(CH_2CH_2O)_4$—$SO_3K$.

10. The coolant composition according to claim 8, wherein the alkali metal compound is dipotassium sebacate.

* * * * *